United States Patent [19]

Fujii et al.

[11] Patent Number: 4,833,210

[45] Date of Patent: May 23, 1989

[54] MODIFIED COPOLYMER

[75] Inventors: Masaki Fujii; Shiroh Gotoh; Sadao Kitagawa, all of Mie, Japan

[73] Assignee: Mitsubishi Petrochemical Co., Ltd., Tokyo, Japan

[21] Appl. No.: 90,394

[22] Filed: Aug. 27, 1987

Related U.S. Application Data

[63] Continuation of Ser. No. 782,565, Oct. 1, 1985, abandoned.

[30] Foreign Application Priority Data

Oct. 2, 1984 [JP] Japan .................. 59-206750
Oct. 2, 1984 [JP] Japan .................. 59-206751

[51] Int. Cl.$^4$ .............................. C08F 8/06
[52] U.S. Cl. ...................... 525/332.1; 525/387
[58] Field of Search ..................... 525/332.1

[56] References Cited

U.S. PATENT DOCUMENTS

| | | | |
|---|---|---|---|
| 2,142,980 | 1/1939 | Huijser et al. | 525/332.8 |
| 3,042,661 | 7/1962 | Kirshenbaum et al. | 525/332.8 |
| 3,214,297 | 10/1965 | Blaise et al. | 525/332.8 |
| 3,450,304 | 6/1969 | Inomata et al. | 525/332.8 |
| 3,525,720 | 8/1970 | Wismer et al. | 525/388 |
| 4,341,672 | 7/1982 | Hsieh et al. | 525/332.8 |
| 4,366,296 | 12/1982 | Kitagawa et al. | 526/29 |
| 4,528,340 | 7/1985 | Hayashi et al. | 525/332.8 |

FOREIGN PATENT DOCUMENTS 774765 5/1957 United Kingdom .
1268149 3/1972 United Kingdom .

*Primary Examiner*—Joseph L. Schofer
*Attorney, Agent, or Firm*—Oblon, Fisher, Spivak, McClelland & Maier

[57] ABSTRACT

A modified copolymer prepared by modifying an unsaturated copolymer resin comprising at least one α-olefin having 2 to 12 carbon atoms and at least one 1,4-dienes represented by formula

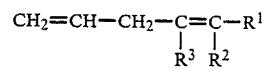

wherein $R^1$, $R^2$ and $R^3$ are defined as hereinbefore, thereby to introduce a hydroxyl group or epoxy group into at least 1% of an olefinically unsaturated bond in the resin. This copolymer has excellent printability and adhesive properties and also has a good durability.

6 Claims, No Drawings

MODIFIED COPOLYMER

This application is a Continuation of application Ser. No. 782,565, filed on Oct. 1, 1985, now adandoned.

FIELD OF THE INVENTION

The present invention relates to a modified copolymer. More particularly, it is concerned with a modified copolymer having good adhesive properties, printability and polymer-modifying properties, which is prepared by introducing a hydroxyl group or epoxy group in an unsaturated copolymer comprising an α-olefin and 1,4-dienes.

BACKGROUND OF THE INVENTION

Homopolymers or copolymers of α-olefin are widely used because they are inexpensive and have excellent mechanical strength, luster, transparency, molding properties, wrapping properties, and resistance to chemicals. These α-olefin polymers, however, have a poor affinity for other substances due to their non-polar molecular structures and therefore are seriously inferior in properties such as adhesive properties, coating properties, printability and antistatic properties.

In order to overcome the above problems, various techniques have been proposed, including a method of partially oxidizing the polymers by treating with a mixed solution containing chromic acid or by flame treatment; a method of grafting a polar group-containing compound such as maleic anhydride, methyl methacrylate, or acrylonitrile, onto the polymers by the action of a radical initiator; and a method of copolymerizing the monomers with polar group-containing comonomers.

These conventional methods, however, have various disadvantages.

The above first method has disadvantages in that the mixed solution is strongly acidic and poisonous, it is difficult to carry out the flame treatment satisfactorily, the oxidation effect is not uniform, and only the surface of a molding can be treated. Therefore, the first method is greatly limited in its industrial use.

The second method has been put to practical use and conducted on a commercial scale in some factories. In this method, however, the polymers to be modified are degraded or undergo cross-linking, thereby leading to a reduction in physical properties thereof. Thus the second method fails to produce polymers satisfying the increasingly severer requirements concerning conditions and manner of use.

The third method has many problems to be solved in its practical use and could not be conducted on a commercial scale.

SUMMARY OF THE INVENTION

The present invention is intended to overcome the above problems and an object of the present invention is to provide a modified copolymer which is prepared by introducing a hydroxyl group or epoxy group into an unsaturated copolymer comprising an α-olefin and 1,4-dienes.

The modified copolymer according to the present invention is prepared by modifying an unsaturated copolymer resin comprising at least one α-olefin having 2 to 12 carbon atoms and at least one 1,4-dienes represented by formula (I)

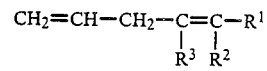

wherein $R^1$ represents an alkyl group having 1 to 8 carbon atoms, and $R^2$ and $R^3$ each represents a hydrogen atom or an alkyl group having 1 to 8 carbon atoms, and having the content of 1,4-dienes of 1 to 50 mol %, to thereby introduce a hydroxyl group or epoxy group in at least 1% of olefinically unsaturated bonds in the unsaturated copolymer resin.

DETAILED DESCRIPTION OF THE INVENTION

The unsaturated copolymer resin which is used in the present invention is a resinous copolymer comprising at least one α-olefin having 2 to 12 carbon atoms and at least one 1,4-dienes represented by formula (I)

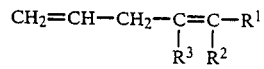

wherein $R^1$ represents an alkyl group having 1 to 8 carbon atoms, and $R^2$ and $R^3$ each represents a hydrogen atom or an alkyl group having 1 to 8 carbon atoms.

Exampes of the α-olefin having 2 to 12 carbon atoms include ethylene, propylene, butene-1, pentene-1, hexene-1, octene-1, 3-methylbutene-1, 3-methylpentene-1, 4-methylpentene-1, 3,3-dimethylbutene-1, 4,4-dimethylpentene-1, 3methylhexene-1, 4-methylhexene-1, 4,4-dimethylhexene-1, 5-methylhexene-1, allylcyclopentane, allylcyclohexane, styrene, allylbenzene, 3-cyclohexylbutene-1, vinylcyclopropane, vinylcyclopentane, vinylcyclohexane, and 2-vinylbicyclo(2,2,1)-heptane. Of these compounds, ethylene, propylene, butene-1, 3-methylbutene-1, 4-methylpentene-1, and styrene are preferred. Particularly preferred are ethylene, propylene, and 4-methylpentene-1. These α-olefins can be used as mixtures comprising two or more thereof.

Examples of the 1,4-dienes represented by formula (I) include 1,4-hexadiene, 1,4-heptadiene, 4-methyl-1,4-hexadiene, 5-methyl-1,4-hexadiene, 4-ethyl-1,4-hexadiene, 4,5-dimethyl-1,4-hexadiene, 4-methyl-1,4-heptadiene, 4-ethyl-1, 4-heptadiene, 5-methyl-1,4-heptadiene, 4-ethyl-1,4-octadiene, 5-methyl-1,4-octadiene, and 4-n-propyl-1,4-decadiene. Of these monomers, 1,4-hexadiene, 4-methyl-1,4-hexadiene, and 5-methyl-1,4-hexadiene are preferred. Particularly preferred are 4-methyl-1,4-hexadiene and 5-methyl-1,4-hexadiene. These 1,4-dienes can be used as mixtures comprising two or more thereof. A preferred combination thereof is a mixture of 4-methyl-1,4-hexadiene and 5-methyl-1,4hexadiene (95:5 to 5:95 by weight).

The unsaturated copolymer resin of the present invention is prepared by copolymerizing the above α-olefin and 1,4-dienes in the presence of a Ziegler Natta catalyst for polymerization of α-olefins, using the same methods and apparatuses as used in production of α-olefin polymers. Typical examples of such preparation methods are described, for example, in U.S. Pat. No. 4,366,296 and Japanese Patent Application (OPI) Nos. 36508/81 and 55409/81.

The α-olefin unit may be present in the unsaturated polymer resin in a random or block configuration.

Types of the unsaturated polymer resin which are preferred from a standpoint of the molecular structure are shown below.

(1) A random polymer of at least one α-olefin and at least one 1,4-dienes.

(2) A block copolymer comprising a polymerization block of at least one α-olefin and a random copolymerization block of at least one α-olefin and at least one 1,4-dienes, wherein the types and ratios of α-olefins in the α-olefin polymerization block may be the same as in or different from those of the α-olefin in the random copolymerization block.

(3) A block copolymer comprising a random copolymerization block (block (a)) of at least one α-olefin and at least one 1,4-dienes and a random copolymerization block (block (b)) of an α-olefin and 1,4-dienes, wherein at least one of the types, numbers and ratios of the α-olefin contained in the block (b) and the types, numbers and ratios of the 1,4dienes contained in the block (b) is different from that of the block (a).

The term "block copolymer" as used herein means a copolymer as defined below. For example, the term "block copolymer comprising a homopolymerization block of monomer A and a random copolymerization block of monomers A and B" includes a copolymer comprising a homopolymerization block of the monomer A and a random copolymerization block of the monomers A and B, which are chemically bonded, as represented by A∼∼A - AABABAAAAB∼, and a mixture of the above copolymer, a homopolymer of the monomer A, and a random copolymer of the monomers A and B.

Similarly, the term "block copolymer comprising a polymerization block (a) and a polymerization block (b)" includes a copolymer comprising the polymerization blocks (a) and (b) chemically bonded, and a mixture of the above copolymer, a polymer comprising the polymerization block (a) alone, and a polymer comprising the polymerization block (b) alone. That is, the term has the same meaning as in a so-called block copolymer produced using a Ziegler Natta catalyst.

The content of 1,4-dienes in the unsaturated copolymer resin which can be used in the present invention is 1 to 50 mol %, preferably 2 to 40 mol %, and more preferably 3 to 30 mol %. If the content thereof is less than 1 mol %, the modification effect is undesirably poor because the unsaturated group content in the unsaturated copolymer resin is small, leading to a reduction in the amount of the hydroxy group or epoxy group to be introduced. On the other hand, if the content thereof is more than 50 mol %, the rate of copolymerization in the production of the unsaturated copolymer resin is too slow, which is unsuitable for practical use.

The melt index of the unsaturated copolymer resin is not particularly limited, but is preferably 0.001 to 1,000 g/10 min. and more preferably 0.01 to 500 g/10 min.

Representative examples of the unsaturated copolymer resin include a random copolymer of propylene and 4-methyl-1, 4-hexadiene; a random copolymer of propylene and 5-methyl-1, 4-hexadiene; a random copolymer of propylene, 4-methyl-1, 4-hexadiene and 5-methyl-1,4-hexadiene; a random copolymer of propylene, ethylene, 4-methyl-1,4-hexadiene and 5-methyl-1, 4-hexadiene; a block copolymer comprising a propylene homopolymerization block and a random copolymerization block of propylene, 4-methyl-1,4-hexadiene and 5-methyl-1,4-hexadiene; a block copolymer comprising a propylene homopolymerization block and a random copolymerization block of ethylene, 4-methyl-1,4-hexadiene and 5-methyl-1,4-hexadiene; a block copolymer comprising an ethylene homopolymerization block and a random copolymerization block of propylene, 4-methyl-1, 4-hexadiene and 5-methyl-1,4-hexadiene; a block copolymer comprising a random copolymerization block of propylene and ethylene, and a random copolymerization block of propylene, ethylene, 4-methyl-1,4-hexadiene and 5-methyl-1,4-hexadiene; a block copolymer comprising a random copolymerization of ethylene, 4-methyl-1,4-hexadiene and 5-methyl-1,4-hexadiene and a random copolymerization block of propylene, 4-methyl-1,4-hexadiene and 5-methyl-1,4-hexadiene; a block copolymer comprising a random copolymerization block of propylene, 4-methyl-1,4-hexadiene and 5-methyl-1,4-hexadiene and a random copolymerization block of propylene, ethylene, 4-methyl-1,4-hexadiene and 5-methyl-1,4-hexadiene; a block copolymer comprising a random copolymerization block of propylene, 4-methyl-1, 4-hexadiene and 5-methyl-1,4-hexadiene, a random copolymerization block of propylene, ethylene, 4-methyl-1,4-hexadiene and 5-methyl-1,4-hexadiene, and a random copolymerization block of ethylene, 4-methyl-1,4-hexadiene and 5-methyl-1, 4-hexadiene; a block copolymer comprising a random copolymerization block of ethylene, 4-methyl-1,4-hexadiene and 5-methyl-1,4-hexadiene and a random copolymerization block of propylene, ethylene, 4-methyl-1,4-hexadiene and 5-methyl-1, 4-hexadiene; a random copolymer of ethylene and 1,4-hexadiene; a random copolymer of ethylene and 4-methyl-1,4-hexadiene; a random copolymer of ethylene and 5-methyl-1,4-hexadiene; a random copolymer of ethylene, 4-methyl-1,4-hexadiene and 5-methyl-1,4-hexadiene; a random copolymer of ethylene, propylene, 4-methyl-1,4-hexadiene and 5-methyl1,4-hexadiene; a random copolymer of ethylene, butene, 4-methyl-1,4-hexadiene and 5-methyl-1,4-hexadiene; a random copolymer of ethylene, 1-hexene, 4-methyl-1,4-hexadiene and 5-methyl-1,4-hexadiene; a random copolymer of ethylene, 4-methyl-1-pentene, 4-methyl-1,4-hexadiene and 5-methyl-1,4-hexadiene; a block copolymer comprising an ethylene homopolymerization block and a random copolymerization block of ethylene and 1,4-hexadiene; a block copolymer comprising an ethylene homopolymerization block and a random copolymerization block of ethylene, 4-methyl-1,4-hexadiene and 5-methyl-1,4-hexadiene; a random copolymer of butene-1, 4-methy--1,4-hexadiene and 5-methyl-1,4-hexadiene; a random copolymer of 3-methyl-1-butene, 4-methyl-1,4-hexadiene, and 5-methyl-1,4-hexadiene; and a random copolymer of 4-methyl-1-pentene, 4-methyl-1,4-hexadiene and 5-methyl-1,4-hexadiene.

Of the above polymers, the following are preferred from standpoints of commercial availability of α-olefin and easy production of polymers.

A random copolymer of propylene, 4-methyl-1,4-hexadiene and 5-methyl-1,4-hexadiene; a block copolymer comprising a propylene homopolymerization block and a random copolymerization block of ethylene, 4-methyl-1,4-hexadiene, and 5-methyl-1,4-hexadiene; and a random copolymer of ethylene, 4-methyl-1,4-hexadiene and 5-methyl-1,4-hexadiene.

A hydroxyl group or epoxy group is introduced into the olefinically unsaturated bond of the unsaturated copolymer resin.

The expression "introduction of a hydroxyl group or epoxy group into the olefinically unsaturated bond"

means to derive the hydroxyl group or epoxy group by utilizing the olefinically unsaturated bond.

There are no special limitations to a method of introducing a hydroxyl group into the unsaturated copolymer resin. Such methods can be classified into three groups: a method of oxidizing an olefinically unsaturated bond, a method of adding a compound containing at least one hydroxyl group in the molecule to the olefinically unsaturated bond, and other methods.

Typical examples of the method of oxidizing the olefinically unsaturated bond are a method using an organic acid such as an aqueous hydrogen peroxide solution and formic acid, wherein the desired product is prepared through peracid; a method of oxidizing with a permanganic acid salt, for example, in the presence or absence of a phase transfer catalyst, a method of oxidizing with an aqueous hydrogen peroxide solution and a permanganic acid salt with the oxide of, e.g., osmium, ruthenium, tungsten or selenium as a catalyst, and a method of hydrolyzing an epoxy group introduced by various techniques such as hydrolysis of a halogen (e.g., bromine) or hydrogen halide adduct, or a sulfuric acid adduct.

Examples of the compound containing at least one hydroxyl group in the molecule are thiol compounds such as thioglycerol and thioglycol, and phenols. In addition, the hydroxyl group can be introduced by techniques such as addition reaction of aldehyde which is known as the Prince reaction, hydroboration followed by oxidation, and oxymercurization using mercury acetate, for example, followed by demercurization.

A method of introducing an epoxy group into the unsaturated copolymer resin is not particularly limited. Such methods can be classified into three groups: a method of oxidizing the olefinically unsaturated bond, a method of adding a compound containing at least one epoxy group in the molecule to the olefinically unsaturated bond, and other methods.

Examples of the method of oxidizing the olefinically unsaturated bond are a method of oxidizing with a peracid such as performic acid, peracetic acid, and perbenzoic acid; a method of oxidizing with hydrogen peroxide or hydroperoxide in the presence or absence of a catalyst such as a vanadium, tungsten, or molybdenum compound; a method of oxidizing with alkaline hydrogen peroxide; and a method of oxidizing with sodium hypochlorite, for example, in the presence of a porphyrin complex or phase transfer catalyst.

Compounds containing at least one epoxy group in the molecule which can be used in the addition reaction are thiol compounds such as thioglycidol and glycidyl thioglycolate.

Another method of introducing an epoxy group is a method of neutralizing an acetic acid/t-butyl hypochlorite adduct with an alkali.

The reaction to introduce a hydroxyl group or epoxy group is mainly carried out in the state that the unsaturated copolymer resin is dissolved or melted, but the reaction may be carried out in the state that the unsaturated copolymer resin is swelled with a solvent. Solvents which can be used for this purpose include aliphatic, alicyclic and aromatic hydrocarbons and their halides, esters having at least 10 carbon atoms, ethers having at least 10 carbon atoms, ketones having at least 10 carbon atoms, and carbon disulfide. These solvents can be used alone or in combination with each other.

Even if the selectivity is not 100%, so long as the hydroxyl group or epoxy group is substantially introduced, products due to side reactions may be mixed with the co-polymer resin having the hydroxyl group or epoxy group introduced therein.

The hydroxyl group or epoxy group is introduced in at least 1% of the olefinically unsaturated bond in the unsaturated copolymer resin. The amount of the hydroxyl group or epoxy group introduced is at least 1%, preferably at least 5% and more preferably at least 10%. If the amount of the hydroxyl group or epoxy group introduced is less than 1%, the hydroxy group or epoxy group content is low and the modification effect is poor.

The modified copolymer according to the present invention exhibits distinctive characteristics because it has a hydroxyl group or epoxy group in the branched chain thereof. For example, the modified copolymer has excellent adhesion properties to various printing inks and paints, and exhibits a good dyeability. Also the modified copolymer has an exclllent adhesion properties to various metals such as aluminum and steel. Moreover the modified copolymer exhibits excellent properties as a binder for resins which are incompatible with each other and greatly contributes to increase, in particular, the interfacial strength between a polyolefin resin and a resin having a functional group reactive with a hydroxyl group or epoxy group.

Furthermore, since the modified copolymer has an excellent affinity for various fillers, or forms a chemical bond with the fillers, it is very effective to improve the filler retention force and the physical properties of a filler-containing resin composition.

The modified copolymer having a hydroxyl group is hydrophilic and exhibits permanent antistatic and antifogging properties. Thus the modified copolymer is expected to show gas barrier properties when its hydroxyl group content is increased.

On the other hand, the modified copolymer having an epoxy group becomes hydrophilic by deriving glycol from the epoxy group, and thus it can be modified into a resin having excellent antistatic and antifogging properties.

Moreover, since the hydroxyl group or epoxy group of the modified copolymer has a high reactivity, compounds having a functional group capable of imparting antioxidizing properties, ultraviolet ray-absorbing properties, antistatic properties, antifogging properties, light-sensitive properties and fluorescent properties can be introduced in the modified copolymer to thereby impare the above properties to the modified copolymer.

The present invention is described in greater detail by reference to the following examples. Unless otherwise indicated, all percents, parts, ratios and the like are by weight.

PRODUCTION EXAMPLE 1

Five liters of a 4-methyl-1,4-hexadiene/5-methyl-1,4-hexadiene (3:2) mixture was introduced in a 10 liter autoclave equipped with a stirrer under an ethylene atmosphere, and 3.0 g of triethylaluminum and 1.0 g of a solid titanium catalyst containing magnesium were then added thereto. After 4 Nl of hydrogen was added, copolymerization was conducted at 65° C. for 4 hours while maintaining an ethylene partial pressure at 1.5 kg/cm$^2$. A copolymer slurry from which the catalyst had been removed was subjected to steam stripping and then dried under reduced pressure to obtain 970 g of a copolymer.

The melt index of the copolymer was 2.1 g/10 min. at 190° C., and its 4-methyl-1,4-hexadiene/5-methyl-1,4- hexadiene mixture content was 9.5 mol %. This copolymer is designated "Resin A".

PRODUCTION EXAMPLE 2

Five liters of the same 4-methyl-1,4-hexadiene/5-methyl-1,4-hexadiene mixture as used in Production Example 1 was introduced in a 10 liter autoclave equipped with a stirrer in a propylene atmosphere, and 2.1 g of diethylaluminum chloride and 3.5 g of titanium trichloride (produced by Marubeni Solvay Co., Ltd.) were then added thereto. After 0.2 Nl of hydrogen was added, copolymerization was carried out at 70° C. for 4 hours while pressurizing with propylene so that the total pressure was 1.0 kg/cm$^2$ (gauge pressure). A copolymer slurry from which the catalyst had been removed was subjected to steam stripping and then dried under reduced pressure to obtain 770 g of a copolymer.

The melt index of the copolymer was 7.0 g/10 min. at 230° C., and its 4-methyl-1,4-hexadiene/5-methyl-1,4-hexadiene mixture content was 10.2 mol %. This copolymer was designated "Resin B".

PRODUCTION EXAMPLE 3

Forty liters of the same 4-methyl-1,4-hexadiene/5-methyl-1,4-hexadiene mixture as used in Production Example 1 was introduced in a 100 liter autoclave equipped with a stirrer in a propylene atmosphere, and 115 g of diethylaluminum chloride and 22 g of titanium trichloride (produced by Marubeni Solvay Co., Ltd.) were then added thereto. Copolymerization was conducted at 75° C. for 4 hours while pressurizing with propylene and hydrogen so that the proportion of hydrogen was maintained at 0.9 vol % and the total pressure was 1.8 kg/cm$^2$ (gauge pressure). A copolymer slurry from which the catalyst had been removed was subjected to steam stripping and then dried under reduced pressure to obtain 8.2 kg of a copolymer.

The melt index of the copolymer was 14.5 g/10 min. at 230° C., and the 4-methyl-1,4-hexadiene/5-methyl-1,4-hexadiene mixture content was 13.2 mol %. This copolymer was designated "Resin C".

EXAMPLE 1

5.0 g of the Resin A obtained in Production Example 1 was dissolved in 200 ml of xylene at 100° C. A mixture of 28.5 g of 90% formic acid and 3.2 g of a 30% aqueous hydrogen peroxide solution, which had been prepared by mixing them at room temperature, was added dropwise to the aboveprepared solution over about 1 hour. The resulting mixture was heated at 105° C. for 1 hour. After neutralization with alcoholic NaOH, the mixture was poured into a large amount of cooled acetone to precipitate a polymer. This polymer was filtered off, washed with acetone and then dried under reduced pressure to obtain a modified copolymer.

Infrared and NMR analyses confirmed that a hydroxyl group w as introduced into the copolymer. The conversion of an olefinically unsaturated bond in the copolymer into a hydroxyl group as determined by the NMR spectral method was 65 mol %.

EXAMPLE 2

6.5 g of the Resin B obtained in Production Example 2 was dissolved in 250 ml of xylene at 120° C. A mixture of 10 g of acetic acid, 1.6 g of paraformaldehyde, and 98% concentrated sulfuric acid was added to the above-prepared solution and then refluxed for 8 hours while vigorously stirring. After neutralization with alcoholic NaOH, the mixture was poured into a large amount of cooled acetone to precipitate a polymer. This polymer was filtered off, washed with acetone and then dried under reduced pressure to obtain a modified copolymer.

Infrared and NMR analyses confirmed that a hydroxyl group was introduced into the copolymer. The conversion of the olefinically unsaturated bond in the copolymer into the hydroxyl group as determined by the NMR spectral method was 32 mol %.

EXAMPLE 3

36 g of the Resin B obtained in Production Example 2 and 1.8 g of thioglycol were melt kneaded in a 50 milliliter kneader at 190° C. for 5 minutes at 60 rpm to obtain a modified copolymer.

2 g of the modified copolymer thus obtained was dissolved in 100 ml of xylene by heating at 135° C. and then poured into a large amount of cooled acetone to precipitate a polymer. This polymer was filtered off, washed with acetone and then dried under reduced pressure to obtain a purified modified copolymer.

Infrared and NMR analyses confirmed that a hydroxyl group was introduced into the copolymer. The degree of addition reaction of the olefinically unsaturated bond in the copolymer as determined by the NMR spectral method was 18 mol %.

EXAMPLE 4

5.0 g of the Resin A obtained in Production Example 1 was dissolved in 200 ml of xylene at 100° C. A xylene solution containing 14 mmol of meta-chlorobenzoic acid was added to the above-prepared solution, and the resulting mixture was maintained at 100° C. for 3 hours. The mixture was then poured into a large amount of cooled methanol to precipitate a polymer. This polymer was filtered off, washed with methanol and then dried under reduced pressure to obtain a modified copolymer.

Infrared and NMR spectral analyses confirmed that an epoxy group was introduced into the copolymer. The conversion of the olefinically unsaturated bond in the copolymer into the epoxy group as determined by the NMR spectral method was 47 mol %.

EXAMPLE 5

6.5 g of the Resin B obtained in Production Example 2 was dissolved in 250 ml of xylene at 130° C. To the resulting solution were added 1.25 g of tert-butyl hydroperoxide peroxide and 0.02 g hexacarbonyl molybdenum, and the resulting mixture was heated at 130° C. for 1 hour. The reaction mixture was poured into a large amount of cooled methanol to precipitate a polymer. This polymer was filtered off, washed with methanol and then dried under reduced pressure to obtain a modified copolymer.

The conversion of the olefinically unsaturated bond in the copolymer into an epoxy group was 83 mol %.

EXAMPLE 6

36 g of the Resin B obtained in Production Example 2 and 3.8 g of glycidyl thioglycoate were melt kneaded in a 50 milliliter kneader at 190° C. for 5 minutes at 60 rpm to obtain a modified copolymer.

2 g of this modified copolymer was dissolved in 100 ml of xylene by heating at 135° C. and the resulting mixture was poured into a large amount of cooled methanol to precipitate a polymer. This polymer was filtered off, washed with methanol and then dried under reduced pressure to obtain a purified modified copolymer.

Infrared and NMR analyses confirmed that an epoxy group was introduced into the copolymer. The degree of addition reaction of the olefinically unsaturated bond in the copolymer as determined by the NMR spectral method was 16 mol %.

EXAMPLE 7

A mixture of 3.0 kg of the Resin C obtained in Production Example 3, 1.4 kg of cumyl hydroperoxide, 10.9 g of molybdenum octylate, and 70 l of cumene was introduced in a 150 liter autoclave equipped with a stirrer and then heated. After the temperature in the autoclave reached 110° C., the reaction was continued for 1 hour. The reaction mixture was then transferred into 100 l of a 5% aqueous solution of sodium hydroxide and the mixture was stirred for 2 hours. The resulting mixture was then poured in a large amount of cooled acetone to precipitate a polymer. This polymer was filtered off, washed with acetone and then dried under reduced pressure to obtain 2.8 kg of a modified copolymer.

The conversion of the olefinically unsaturated bond in the copolymer into an epoxy group as determined by the NMR spectral method was 59.8 mol %.

APPLICATION EXAMPLE 1

A diluted xylene solution of the modified copolymer as prepared in Example 7 was coated on the surface of a polypropylene sheet in a small thickness and then dried. A polyamide film was adhered with the coating on the polypropylene sheet at 240° C. for 1 minute. As a result, the polyamide film was completely bonded to the polypropylene sheet. The adhesion was so complete that the polyamide film could not be peeled off without being broken.

On the other hand, when the modified copolymer was not coated, the polyamide film was not substantially bonded and could be peeled apart easily from the polypropylene sheet. Thus it can be seen that the modified copolymer of the present invention has an excellent adhesion force.

While the invention has been described in detail and with reference to specific embodiments thereof, it will be apparent to one skilled in the art that various changes and modifications can be made therein without departing from the spirit and scope thereof.

What is claimed is:

1. A modified copolymer which is obtained by oxidizing with hydrogen peroxide or hydroperoxide, in the presence of a catalyst selected from the group consisting of a vanadium compound, a tungsten compound and a molybdenum compound, an unsaturated copolymer resin comprising at least one α-olefin selected from the group consisting of ethylene, propylene and 4-methyl-pentene-1, and at least one 1,4-diene selected from the group consisting of 1,4-hexadiene, 4-methyl-1,4-hexadiene and 5-methyl-1,4-hexadiene having a content of 1,4-diene of 3 to 30 mol %, and having a melt index of 0.01 to 500 g/10 min., said unsaturated copolymer resin having been obtained by copolymerization in the presence of a Ziegler-Natta catalyst, said resulting modified copolymer having an epoxy group in at least 10% of the olefinically unsaturated bonds of said unsaturated copolymer.

2. The modified copolymer as in claim 1, wherein the catalyst is a molybdenum compound.

3. The modified copolymer as in claim 2, wherein the catalyst is hexacarbonyl molybdenum or molybdenum octylate.

4. The modified copolymer as in claim 1, wherein the hydroperoxide is tert-butyl hydroperoxide or cumyl hydroperoxide.

5. The modified copolymer as in claim 1, wherein said α-olefin is propylene.

6. The modified copolymer as in claim 1, wherein the epoxy group is in at least approximately 60% of the olefinically unsaturated bonds of said unsaturated copolymer.

* * * * *